United States Patent
Jokela

(10) Patent No.: US 10,965,724 B2
(45) Date of Patent: Mar. 30, 2021

(54) COMMUNICATION SOLUTION

(71) Applicant: Telia Company AB, Solna (SE)

(72) Inventor: Harri Jokela, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/722,298

(22) Filed: Dec. 20, 2019

(65) Prior Publication Data

US 2020/0204601 A1    Jun. 25, 2020

(30) Foreign Application Priority Data

Dec. 20, 2018   (FI) ...................................... 20186117

(51) Int. Cl.
| | |
|---|---|
| *G06F 15/16* | (2006.01) |
| *H04L 29/06* | (2006.01) |
| *H04L 12/18* | (2006.01) |
| *H04L 12/58* | (2006.01) |
| *H04L 29/08* | (2006.01) |

(52) U.S. Cl.
CPC ........ *H04L 65/403* (2013.01); *H04L 12/1818* (2013.01); *H04L 51/046* (2013.01); *H04L 65/1069* (2013.01); *H04L 65/608* (2013.01); *H04L 65/80* (2013.01); *H04L 67/02* (2013.01); *H04L 67/141* (2013.01); *H04L 67/146* (2013.01)

(58) Field of Classification Search
CPC . H04L 65/403; H04L 65/1069; H04L 65/608; H04L 65/80; H04L 67/02; H04L 67/141; H04L 67/146; H04L 51/046; H04L 12/1818
See application file for complete search history.

(56) References Cited

U.S. PATENT DOCUMENTS

| 8,601,144 B1 * | 12/2013 | Ryner | ..................... G06F 21/45 |
| | | | 709/228 |
| 9,083,770 B1 | 7/2015 | Drose et al. | |
| 10,021,429 B1 * | 7/2018 | Talvensaari | ............. H04L 43/16 |

(Continued)

FOREIGN PATENT DOCUMENTS

GB    2398204 A  *  8/2004  ........... H04L 67/303

OTHER PUBLICATIONS

Finnish Search Report, FI 20186117, dated Jun. 24, 2019.

*Primary Examiner* — Jonathan A Bui
(74) *Attorney, Agent, or Firm* — Nixon & Vanderhye

(57) ABSTRACT

Disclosed is a method for establishing a communication session. The method includes: establishing a chat session between a first terminal device and a second terminal device, determining if both the first terminal device and the second terminal device support a specific communication technology, forwarding an invitation to initiate communication over the specific communication technology, in response to a detection that the invitation is accepted requesting from a communication server an initiation of a communication channel implemented with the specific communication technology, and in response to an establishment of the communication channel implemented with the specific communication technology establishing the communication session for communicating at least over the specific communication technology. Also disclosed is a chat server, a computer program product and a system.

14 Claims, 2 Drawing Sheets

(56) References Cited

U.S. PATENT DOCUMENTS

| | | | |
|---|---|---|---|
| 2004/0047437 A1* | 3/2004 | Hamiti | H04L 69/24 375/326 |
| 2008/0151872 A1* | 6/2008 | Chen | H04L 12/66 370/352 |
| 2015/0081769 A1* | 3/2015 | Mandyam | H04L 67/02 709/203 |
| 2015/0103137 A1* | 4/2015 | Eisenberg | H04L 65/1083 348/14.09 |
| 2016/0241604 A1* | 8/2016 | Klein | H04L 65/403 |
| 2016/0313906 A1 | 10/2016 | Kilchenko et al. | |
| 2016/0330252 A1* | 11/2016 | Stahl | H04M 7/0066 |
| 2016/0337410 A1* | 11/2016 | Hancock | H04L 65/608 |
| 2017/0060112 A1* | 3/2017 | Pirner | G06F 21/79 |
| 2017/0163422 A1* | 6/2017 | Chatterjee | H04L 65/80 |
| 2017/0195391 A1* | 7/2017 | Elad | H04L 65/1069 |
| 2017/0195392 A1* | 7/2017 | Elad | H04L 65/4015 |
| 2018/0084111 A1 | 3/2018 | Pirat | |
| 2018/0103073 A1 | 4/2018 | Rosenberg et al. | |
| 2019/0028517 A1* | 1/2019 | Zheng | H04L 65/1046 |
| 2019/0028581 A1* | 1/2019 | Zheng | G06K 19/06037 |
| 2019/0058740 A1* | 2/2019 | Singman | H04L 67/02 |
| 2020/0177659 A1* | 6/2020 | Strom | G07F 17/3225 |

* cited by examiner

COMMUNICATION SOLUTION

TECHNICAL FIELD

The invention concerns in general the technical field of communications. More particularly, the invention concerns a solution for managing communication connection between communicating parties.

BACKGROUND

Today there exists a wide range of communication solutions suitable for different purposes. Commonly known ways of communicating are messaging, chatting, voice communication and video conference just to name few. There also exist solutions which are suitable for combining a plurality of the above listed ways of communicating. For example, an application may provide a way to establish a video conference session where live video and voice are carried, but which also enables chatting concurrently to the video conference session.

Further, a trend of digitalization has taken many services provided by companies, as well as their introduction, to Internet. This means that a person may access the information through a web page of the company or the service in question. Many times the persons accessing the web page may need a real-time service even so that they remain unknown to the service provider, i.e. the company. For this kind of communication many web pages today offer a possibility to communicate with a company representative with a chat application. The web page in question may pop-up a chat window in response to the access to the web page or the person accessing the web page may activate a chat session by indicating it through e.g. an icon on the web page. The chat application offers a possibility to communicate in writing with the company representative without revealing an identity of the person.

However, a drawback of the chat applications is that some matters may be difficult to handle with the messaging through the chat session, and more sophisticated communication, such as a voice call or a video conferencing session may be needed. On the other hand, the persons requesting service through the chat session may be willing to remain unknown to the company also in a situation when the more sophisticated service session is to be established.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a server device, a system and a computer program product for establishing a communication session.

The objectives of the invention are reached by a method, a server device, a system and a computer program product as defined by the respective independent claims.

According to a first aspect, a method for establishing a communication session is provided, the method comprises: establishing a chat session, by a chat server, between a first terminal device and a second terminal device; determining, by the chat server, if both the first terminal device and the second terminal device support a specific communication technology; forwarding, by the chat server, an invitation from at least one of the following: the first terminal device, the second terminal device to the other of the following: the first terminal device, the second terminal device to initiate communication over the specific communication technology, in response to a detection that the other of the following: the first terminal device, the second terminal device accepts the invitation requesting, by the chat server, from a communication server an initiation of a communication channel implemented with the specific communication technology; and in response to an establishment of the communication channel implemented with the specific communication technology establishing the communication session for communicating at least over the specific communication technology.

A determination if both the first terminal device and the second terminal device support the specific communication technology may be performed on a basis of cookie information exchanged in the chat session.

On the other hand, the invitation forwarded by the chat server may be transmitted over a control layer of the chat session.

The specific communication technology may Web Real-Time Communications, WebRTC, service. Further, the Web Real-Time Communications, WebRTC, service may be a voice call service.

According to a second aspect, a chat server is provided, the chat server comprising: at least one processor; at least one memory including computer program code; the at least one memory and the computer program code configured to, with the at least one processor, cause the chat server to perform: establish a chat session between a first terminal device and a second terminal device; determine if both the first terminal device and the second terminal device support a specific communication technology; forward an invitation from at least one of the following: the first terminal device, the second terminal device to the other of the following: the first terminal device, the second terminal device to initiate communication over the specific communication technology; in response to a detection that the other of the following: the first terminal device, the second terminal device accepts the invitation request from a communication server an initiation of a communication channel implemented with the specific communication technology; and in response to an establishment of the communication channel implemented with the specific communication technology establishing the communication session for communicating at least over the specific communication technology.

The chat server may be arranged to determine if both the first terminal device and the second terminal device support the specific communication technology on a basis of cookie information exchanged in the chat session.

The chat server may be arranged to forward the invitation by transmitting it over a control layer of the chat session.

The specific communication technology may be Web Real-Time Communications, WebRTC, service. For example, the Web Real-Time Communications, WebRTC, service may be a voice call service.

According to a third aspect, a computer program product for establishing a communication session is provided which, when executed by at least one processor, cause a computing device to perform the method as described above.

According to a fourth aspect, a system for establishing a communication session is provided, the system comprises: a first terminal device and a second terminal device; a communication server; and a chat server as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
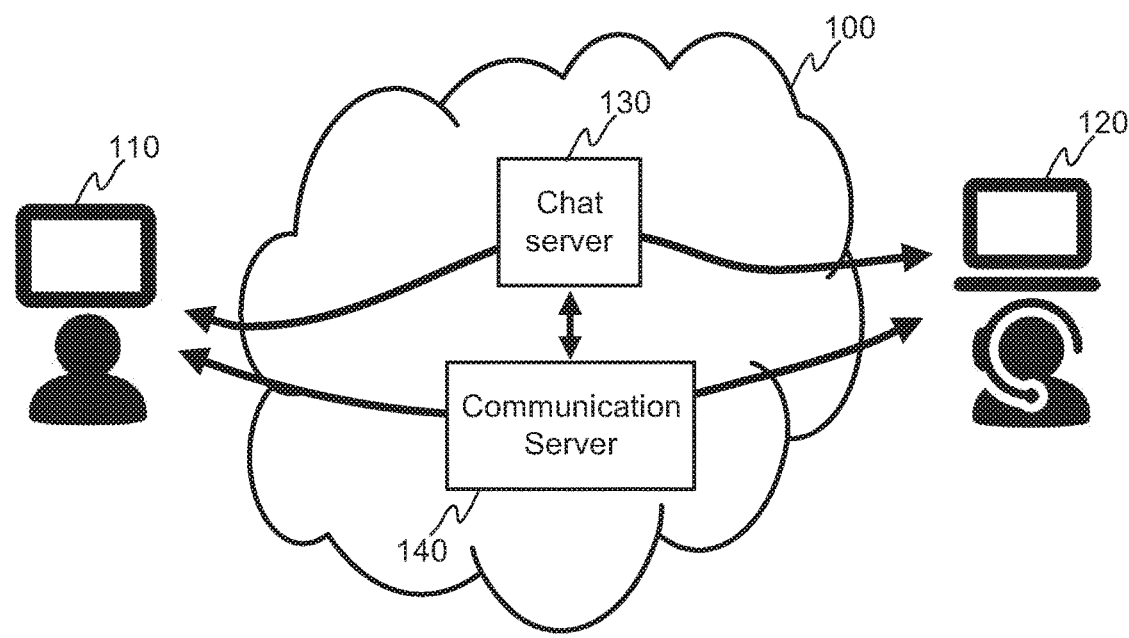
FIG. 1 illustrates schematically a communication system according to an embodiment of the invention.

FIG. 1 illustrates schematically at least some aspects of a communication system as a communication environment implementing the present invention.

There, a user by using his/her terminal device 110, such as a laptop computer, a tablet computer, a mobile phone, a personal computer or any similar, may access to Internet 100. For describing the present invention it is here assumed that the user has accessed to a web page of a service provider, such as a company. The web page may be maintained in a server accessible in Internet. On the web page a chat session may be established between the user and a representative of the web page accessed by the user. The chat session may be initiated by any party i.e. the user or the server maintaining the web page, or the representative of the web page in response to a detection that the user has accessed the web page. The detection of the access to the web page may be performed with known mechanisms, such as identifying http-request and any related information, such as Internet Protocol based network address. The initiation of the chat session may be arranged so that the access to the web page causes a prompting of a chat session to the user. Alternatively or in addition, the web page may contain an icon which, by selection of the user, initiates the chat session. For implementing the chat session between the terminal device 110 and representative's terminal device 120 a selection of the chat session may initiate the chat session on a chat server 130. The chat server 130 may be the same as the server on which the web page is implemented to or the chat session may be directed to another server dedicated to maintaining chat sessions. In other words, the chat server 130 may be arranged to generate and to transmit signals between the communicating entities which may carry at least portion of content input by the user and the representative and any other data.

Above it is described that a chat session may be initiated from a web page accessed by a user. However, the chat session may also be established with a dedicated application or a chat functionality may be embedded in an application as one feature. The present invention may also be applied in the context of these alternatives.

The chat application seen by each of the communicating parties from the corresponding terminal devices 110, 120 may provide a view comprising further icons directing the communication session to a predetermined direction. According to an embodiment of the invention the view seen on a display of the terminal device 110, 120 may comprise an icon which may cause an initiation of a further communication channel in response to the selection of the icon by the user or the representative. The visibility of the icon may e.g. be dependent on capabilities of user's terminal device 110, or its match to capabilities of the representative's terminal device 120. According to an embodiment of the invention the capability required for the further communication channel may be a support to WebRTC (Web Real-Time Communications). The support to the WebRTC may be determined with cookie information exchanged in the chat session, such as when the chat session is initiated. The cookie information may e.g. refer to browser information, such as a version and/or a release data, and add-ons installed in the terminal device(s) and if they are enabled/disabled. If the support to the WebRTC communication between the entities is confirmed, the mentioned icons may be displayed to the communicating parties, or at least a selection of at least one of those may cause an activation of at least one further communication channel.

According to the invention one of the communicating entities may request an establishment of a further or a specific communication channel, which may be a voice call over IP with the WebRTC service. The request may be initiated with the selection of the icon, e.g. by clicking the icon with an input device, in the chat application (cf. the chat session). The selection of the icon causes a generation of a web link to a web-based voice call with the WebRTC service and transmit of the web link to the other communicating party. The transmit of the web link is advantageously performed over a control layer of the chat session. The control layer of the chat session may e.g. carry control signals for establishing and maintaining the chat session. In the example of the present invention the other party of the chat session may receive the web link to WebRTC based voice call and it may e.g. appear, e.g. as a pop-up, on the display of the terminal device 110, 120 of the receiving party e.g. with a prompt to accept the voice call.

In response to a receipt of an acceptance of the voice call by the requested party over the control layer the chat server 130 may be arranged to generate a request to a communication server 140 implementing WebRTC based services, the request carrying data indicating that a voice call session is to be initiated between the communicating parties. The chat server 130 may receive, in an embodiment of the invention, a network address, e.g. expressed as a link, to a voice call session established in the communication server 140 in response to the request. Now, the parties of the communication may, e.g. automatically or in response to a manual indication, connected to the voice call session maintained in the communication server 140 and the voice communication over the voice call session may be initiated in addition to the chat session.

An advantage of the present invention as described above as a non-limiting example is that the communicating parties may remain unknown to each other even if a voice call session is established in addition to the chat session. This is achieved at least in part by utilizing capabilities of the chat session, and application, for initiating the voice call session in the communication server 140.

Figure 2:
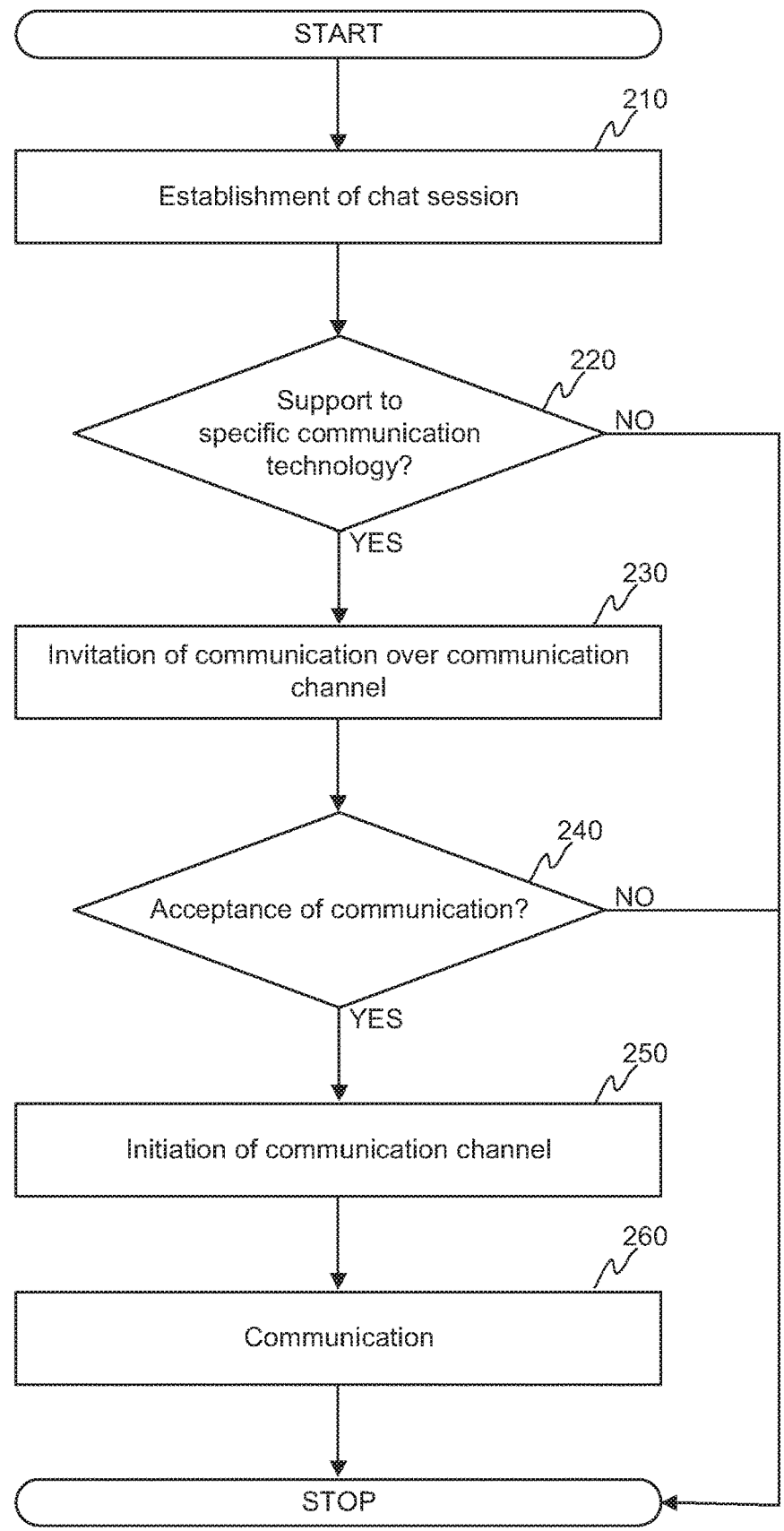
FIG. 2 illustrates schematically a method according to an embodiment of the invention.

FIG. 2 illustrates schematically a method according to an embodiment of the invention describing at least some portions of an operation of the system as schematically illustrated in FIG. 1. As discussed above, a chat session may be established 210 between a user e.g. accessing a web page and a representative of the web page, or any corresponding party. At some point of the chat session a chat server 130, or any corresponding entity being communicatively coupled to the chat server 130, may determine one or more capability related aspects with respect to at least one of the terminal devices 110, 120 being involved in the chat session. According to an embodiment, the capability determination may refer to a determining if the terminal device 110, 120, or terminal devices 110, 120, support a specific communication technology 220 implemented with a predetermined communication technology.

Here, an example of the communication technology may be a voice call established over WebRTC technology. If no support is found, the communication may be continued over the chat session. On the other hand, if it is determined that the support to the specific communication technology exists, it may be arranged that the chat application may prompt at least one of the communicating parties for selecting the supported communication technology e.g. by displaying at least one icon for selection, which selection may cause an activation of at least one further communication channel.

For describing the method further it is hereby assumed that one of the communicating parties selects the icon with a predetermined mechanism and, causes the activation of the communication channel. The activation of the communication channel may refer to a procedure in which a web link to a web-based voice call with the WebRTC service is generated and transmitted to the other communicating party as an invitation 230 over the chat server 130. The invitation may be transmitted, according to an embodiment of the invention, with signaling implemented over a control layer of the chat session.

Next, it may be monitored if the party receiving the invitation accepts the communication 240 over the communication channel or not. This may be detected by monitoring if an acknowledgement indicating the acceptance is received in the chat server 130 from the party in question or if an indication rejecting the communication is received. In the latter case the communication channel is not established. On the other hand, if it is detected that the party accepts the connection request, the chat server 130 may be arranged to generate a request to the communication server 140 to initiate a communication channel 250 and in response to a receipt of the request the communication server 140 may initiate the communication channel 250. As mentioned, the initiation of the communication channel 250 may comprise, but is not limited to, an establishment of a voice call session in the communication server 140 and a generation of a network link to the session, which network link may be provided to the communicating parties over the chat session, e.g. over a control layer. The receipt of the network link by the terminal device 110, 120 may cause an establishment of the communication channel to the communication server 140, and, hence, between the communicating parties. Finally, in step 260 the communication over the established communication channel, such as the voice call over WebRTC, may be performed. The chat session may be maintained in addition to the established voice call.

According to an embodiment of the invention the communication server 140 may require, for establishing the specific communication session, an access token comprising predetermined data. The predetermined data may e.g. refer to an identifier of the chat session or identifier of at least one communicating party or anything similar. The chat server 130 and the communication server 140 may be arranged to establish and to generate such data that requirements for establishing the specific communication session may be fulfilled. Moreover, since the invention relates to a solution in which the communicating parties remain unknown, especially with respect to identification information, such as a phone number or an email address, this may also be indicated to the communication server 140 in the token. The receipt of the above described data by the communication server 140 may cause the communication server 140 to set in a mode protecting the identification information.

In the following a more detailed description of the communication solution according to an embodiment of the invention is described in an environment in which a chat server 130 is arranged to provide chat service for at least one web page and a communication server 140 is implemented with a WebRTC server arranged to provide voice call communication channel, and session thereto. An establishment of the communication connection over a plurality of the communication channel is described step-by-step:

a) A user opens a web page of a company with a terminal device 110.

b) Chat provider's chat widget (Javascript) may be downloaded from a chat server 130 and used in the showed web page.

c) During the chat session capability information of the terminal device(s) 110, 120 may be received by the chat server 130 e.g. in a cookie.

d) Based on the cookie information, the capabilities of the terminal devices 110, 120 may be combined to make a conclusion if WebRTC based communication session (e.g. video, screen-sharing, voice (=WebRTC Add-Ons) are possible to enhance chatting. If yes, at least one of the communicating parties may see a request icon to change or enhance the chat with those capabilities.

e) If either party requests to enhance the chat with WebRTC Add-ons, the request may be transmitted via a control layer of the chat service to the other party.

f) The chat service may request to the WebRTC Add-On session via API from a service provider of the WebRTC service. The chat service may use a token and e.g. a customer representative identification (userid, email address etc.) for the authentication towards the API/service provider of the WebRTC service. In the API request, the voice/screen-sharing/video may be sent as parameters or partly they can be enabled/disabled as QUERY information in the web address, when the web page is opened in a communication window, such as in iFrame window.

g) The API may return WebRTC Add-On web address(es) for the communicating parties over a control channel of the chat service.

h) The WebRTC Add-On web pages may be opened to the communicating parties into the session window, such as in the iFrame window with a control of the chat widget.

i) WebRTC Add-On communication may be initiated over the communication server 140.

It is worthwhile to mention that in some embodiments of the invention the chat server 130 and the communication server 140 may be implemented with a single server device executing both the chat server and the WebRTC based communication server 140.

In the description of the present the specific communication technology refers mainly to a communication session established with a WebRTC technology. The communication session may also be implemented so that for at least one of the parties the communication channel from the communication server 140 is established by utilizing services offered e.g. by public switched telephone network (PSTN). Hence, when the other party, such as the user of the terminal device 110, accepts the link provided to him/her over the chat session, the communication server 140 may be arranged to associate the connection established in response to opening the link with the voice call established over the PSTN to the other communicating party, such as the representative of the web page. Hence, the network identities, such as MSISDN numbers, may remain unknown to the communicating parties with a help of the communication server 140 coordinating the communication over different connections. The connection of the PSTN connection may be associated to WebRTC technology e.g. by means of so-called SIP (Session Initiation Protocol) trunk or by directly connecting it communicatively to IMS (IP Multimedia Subsystem) core element or an IMS application server over an applicable interface.

Figure 3:
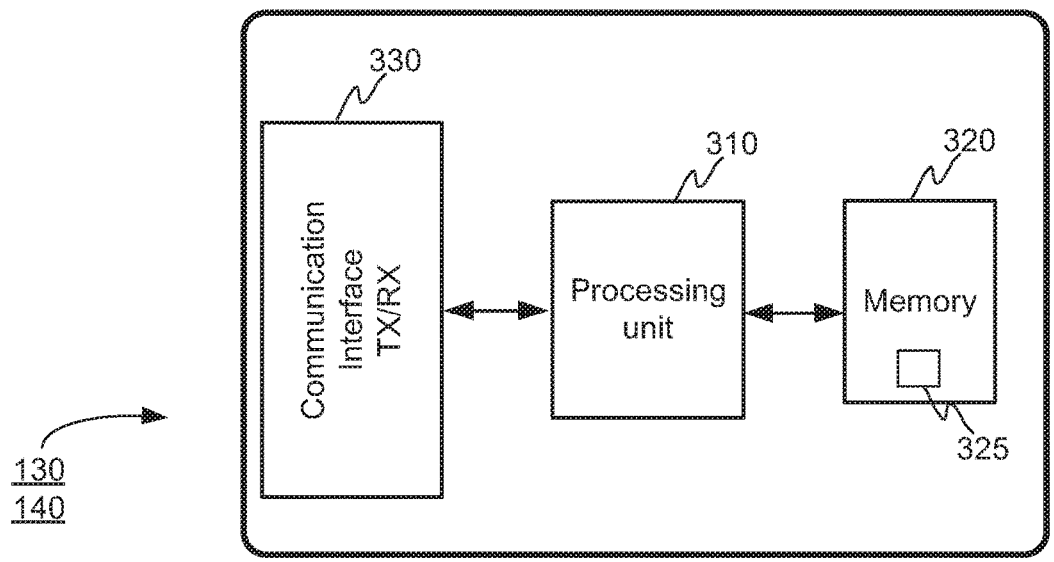
FIG. 3 illustrates schematically a server device according to an embodiment of the invention.

FIG. 3 illustrates schematically a non-limiting example of a server device, such as a chat server 130 or a communication server 140, implementing at least some of the method steps according to an embodiment of the invention. The server device 130, 140 may be communicatively coupled to other entities with either wired or wireless communication technology implemented by a communication interface 330 of the server device 130, 140. The communication interface 330 may comprise necessary hardware and software components, such as a modem, for implementing the communication. Furthermore, the server device 130, 140 may comprise a processing unit 310 comprising one or more processors for performing at least some of the method steps as described. The processing unit 310 may be configured to generate the operational instructions causing the server device 130, 140 to operate accordingly by executing portions of computer program code 325 stored in a memory 320 of the server 140. The computer program code 325 may, in a case of the chat server 130, refer to chat application executed on the server side. On the other hand, the computer program code 325 may, in a case of the communication server, refer to WebRTC based communication application executed on the server side.

Furthermore, some aspects of the present invention may relate to a computer program product comprising at least one computer-readable media having computer-executable program code instructions stored therein that cause, when the computer program product is executed on a computer, such as by a processing unit 310 of a server device 130, 140, a communication according to the method as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for establishing a communication session, the method comprising:
    establishing a chat session, by a chat server, between a first terminal device and a second terminal device, the established chat session allowing an exchange of messages written by a user of the first terminal device and a user of the second terminal device;
    determining, by the chat server, when both the first terminal device and the second terminal device support a Web Real-Time Communications (WebRTC) service;
    forwarding, by the chat server, an invitation from at least one of the first terminal device and the second terminal device to the other of the first terminal device and the second terminal device to initiate communication over the WebRTC service;
    in response to a detection that the other of the first terminal device and the second terminal device accepts the invitation, requesting, by the chat server, from a communication server, an initiation of a communication channel implemented with the WebRTC service; and
    in response to an establishment of the communication channel implemented with the WebRTC service, establishing the communication session for communicating at least over the WebRTC service.

2. The method of claim 1, wherein a determination when both the first terminal device and the second terminal device support the WebRTC service is performed on a basis of cookie information exchanged in the chat session.

3. The method of claim 1, wherein the invitation forwarded by the chat server is transmitted over a control layer of the chat session.

4. The method of claim 1, wherein the WebRTC service is a voice call service.

5. The method of claim 2, wherein the invitation forwarded by the chat server is transmitted over a control layer of the chat session.

6. A chat server, comprising:
    at least one processor; and
    at least one memory including computer program code,
    the at least one memory and the computer program code configured to, with the at least one processor, cause the chat server to:
        establish a chat session between a first terminal device and a second terminal device, the established chat session allowing an exchange of messages written by a user of the first terminal device and a user of the second terminal device,
        determine when both the first terminal device and the second terminal device support a Web Real-Time Communications (WebRTC) service,
        forward an invitation from at least one of the first terminal device and the second terminal device to the other of the first terminal device and the second terminal device to initiate communication over the WebRTC service,
        in response to a detection that the other of the first terminal device and the second terminal device accepts the invitation, request from a communication server an initiation of a communication channel implemented with the WebRTC service, and
        in response to an establishment of the communication channel implemented with the WebRTC service establish the communication session for communicating at least over the WebRTC service.

7. The chat server of claim 6, wherein the chat server is arranged to determine when both the first terminal device and the second terminal device support the WebRTC service on a basis of cookie information exchanged in the chat session.

8. The chat server of claim 6, wherein the chat server is arranged to forward the invitation by transmitting the invitation over a control layer of the chat session.

9. The chat server of claim 6, wherein the WebRTC service is a voice call service.

10. A system for establishing a communication session, the system comprising:
   the chat server of claim 6;
   the first terminal device;
   the second terminal device; and
   the communication server.

11. The chat server of claim 7, wherein the chat server is arranged to forward the invitation by transmitting the invitation over a control layer of the chat session.

12. The chat server of claim 7, wherein the WebRTC service is a voice call service.

13. The chat server of claim 8, wherein the WebRTC service is a voice call service.

14. A non-transitory computer-readable medium on which is stored a computer program for establishing a communication session which, when executed by at least one processor, cause a computing device to perform a method for establishing a communication session the method comprising:
   establishing a chat session, by a chat server, between a first terminal device and a second terminal device, the established chat session allowing an exchange of messages written by a user of the first terminal device and a user of the second terminal device;
   determining, by the chat server, when both the first terminal device and the second terminal device support a Web Real-Time Communications (WebRTC) service;
   forwarding, by the chat server, an invitation from at least one of the first terminal device and the second terminal device to the other of the first terminal device and the second terminal device to initiate communication over the WebRTC service;
   in response to a detection that the other of the first terminal device and the second terminal device accepts the invitation, requesting, by the chat server, from a communication server, an initiation of a communication channel implemented with the WebRTC service; and
   in response to an establishment of the communication channel implemented with the WebRTC service, establishing the communication session for communicating at least over the WebRTC service.

* * * * *